United States Patent
Abdelhafiz et al.

(10) Patent No.: US 11,765,011 B2
(45) Date of Patent: Sep. 19, 2023

(54) METHOD AND APPARATUS FOR TRANSMITTING AND RECEIVING DATA

(71) Applicant: Huawei Technologies Co., Ltd., Guangdong (CN)

(72) Inventors: Abubaker Abdelhafiz, Calgary (CA); Ming Jian, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 17/368,350

(22) Filed: Jul. 6, 2021

(65) Prior Publication Data
US 2023/0009343 A1   Jan. 12, 2023

(51) Int. Cl.
| | | |
|---|---|---|
| H04L 27/26 | (2006.01) | |
| G06N 3/08 | (2023.01) | |
| H04B 1/62 | (2006.01) | |
| G06N 3/045 | (2023.01) | |

(52) U.S. Cl.
CPC ......... H04L 27/2623 (2013.01); G06N 3/045 (2023.01); G06N 3/08 (2013.01); H04B 1/62 (2013.01)

(58) Field of Classification Search
CPC ............ H04L 27/2623; H04L 27/2614; H04L 27/3411; H04L 27/2624; H04B 1/62
USPC ................................................ 375/295, 340
See application file for complete search history.

(56) References Cited

U.S. PATENT DOCUMENTS

| | | | |
|---|---|---|---|
| 6,314,146 B1 * | 11/2001 | Tellado | ............... H04L 27/2647 455/296 |
| 7,031,251 B2 * | 4/2006 | Chen | .................... H04L 27/2623 370/208 |
| 7,747,224 B2 | 6/2010 | McCallister et al. | |
| 7,995,602 B2 | 8/2011 | Cimini, Jr. et al. | |
| 8,040,787 B2 | 10/2011 | Bar-Ness et al. | |
| 8,131,218 B2 | 3/2012 | Kleider et al. | |
| 8,175,177 B2 | 5/2012 | Wang | |
| 8,175,179 B2 | 5/2012 | Baliga et al. | |
| 8,290,085 B2 | 10/2012 | Chan et al. | |
| 8,442,137 B2 | 5/2013 | Moffatt et al. | |
| 8,483,296 B2 | 7/2013 | Al-Naffouri et al. | |
| 8,571,000 B2 | 10/2013 | Zhou et al. | |

(Continued)

FOREIGN PATENT DOCUMENTS

| | | | | |
|---|---|---|---|---|
| CN | 105721056 A | | 6/2016 | |
| CN | 109600335 A | * | 4/2019 | ............. G06N 3/084 |

(Continued)

OTHER PUBLICATIONS

Huleihel, Yara, Eilam Ben-Dror, and Haim H. Permuter. "Low PAPR Waveform Design for OFDM Systems Based on Convolutional Autoencoder." In 2020 IEEE International Conference on Advanced Networks and Telecommunications Systems (ANTS), pp. 1-6. IEEE, 2020.

*Primary Examiner* — Emmanuel Bayard
(74) *Attorney, Agent, or Firm* — Slater Matsil, LLP

(57) ABSTRACT

There is provided a method of transmitting and receiving data across a network. A receiver device comprises a recovery module comprising a neural network trained to recover signals from clipped signals. The transmitter device may clip the original signal more aggressively due to the improved performance of the machine-learning based recovery module, thereby reducing the Peak to Average Power Ratio (PAPR) of the signal.

18 Claims, 10 Drawing Sheets

(56) References Cited

U.S. PATENT DOCUMENTS

| | | |
|---|---|---|
| 8,599,963 B2 | 12/2013 | Chan et al. |
| 8,670,502 B2 | 3/2014 | Morris et al. |
| 8,767,851 B2 | 7/2014 | McGowan et al. |
| 8,842,757 B2 | 9/2014 | Guo et al. |
| 8,948,295 B1 | 2/2015 | Nishikawa |
| 9,036,569 B2 | 5/2015 | Bitran et al. |
| 9,544,897 B2 | 1/2017 | Vijayan et al. |
| 9,554,303 B1 | 1/2017 | Hitt et al. |
| 10,027,354 B2 | 7/2018 | Cohen |
| 10,122,560 B2 | 11/2018 | Tosato et al. |
| 10,127,918 B1* | 11/2018 | Kamath Koteshwara ............ G10L 21/02 |
| 10,601,623 B2 | 3/2020 | Terry |
| 10,616,025 B2 | 4/2020 | Terry |
| 2010/0080309 A1 | 4/2010 | Moffatt et al. |
| 2017/0163296 A1* | 6/2017 | Terry .................. H04B 1/69 |
| 2018/0109408 A1 | 4/2018 | Sandell et al. |
| 2019/0274108 A1 | 9/2019 | O'Shea et al. |
| 2020/0400811 A1* | 12/2020 | Gu ........................ G01S 7/417 |
| 2021/0103813 A1* | 4/2021 | Rangu .................. H04N 19/50 |
| 2021/0150771 A1* | 5/2021 | Huang .................. G06N 5/046 |
| 2021/0233541 A1* | 7/2021 | Chen .................... G10L 17/04 |
| 2021/0266203 A1* | 8/2021 | Yoo ...................... H04B 1/0475 |
| 2021/0266875 A1* | 8/2021 | Namgoong ......... H04W 64/003 |
| 2021/0304355 A1* | 9/2021 | Delattre ................ G06T 1/20 |
| 2021/0377091 A1* | 12/2021 | Zach .................... H04L 1/0004 |
| 2021/0385116 A1* | 12/2021 | Zach .................... H04L 27/2614 |
| 2022/0210446 A1* | 6/2022 | Auyeung ............. H04N 19/132 |
| 2022/0358351 A1* | 11/2022 | Kale .................... G06F 21/6218 |
| 2022/0385911 A1* | 12/2022 | Ferrara ................. H04N 19/136 |
| 2022/0386151 A1* | 12/2022 | Eger .................... H04W 8/24 |

FOREIGN PATENT DOCUMENTS

| | | |
|---|---|---|
| CN | 109600335 A | 4/2019 |
| EP | 1953981 A1 | 8/2008 |
| GB | 2547041 A | 8/2017 |
| WO | 2020191591 A1 | 10/2020 |

* cited by examiner

METHOD AND APPARATUS FOR TRANSMITTING AND RECEIVING DATA

OTHER APPLICATIONS

The present application is the first application for this disclosure.

TECHNICAL FIELD

The present disclosure relates to Peak-to-Average Power Ratio (PAPR) reduction. Specifically, the present disclosure relates to a method of using machine learning to reduce PAPR on single carrier signals.

BACKGROUND

As wireless standards continue to evolve to meet the ever-growing demand for higher data-rates and larger bandwidths from consumers, higher-order modulation schemes are deployed. This has led to a large increase to the Peak-to-Average Power Ratio (PAPR) of the signals used.

A power amplifier (PA) is a component of wireless devices which consumes a large amount of power. The efficiency of a PA is correlated to the distortion generated by the PA, such that greater efficiency leads to greater distortion. There is therefore a trade-off that is made between efficiency and distortion: either prioritize efficiency at the cost of generating more signal distortion in and outside of the signal band, or opt for signal quality at the expense of sacrificing the energy efficiency of the PA and in turn, of the device as a whole.

In some communication systems, methods such as digital predistortion (DPD) and input back-off (IBO) are used, sometimes in combination with each other, to reduce the distortion caused by operating the PA with higher efficiency. IBO requires operation at a lowered efficiency, whereas DPD maintains acceptable signal quality by pre-compensating the PA's distortive behavior.

Accordingly, there is a need for improved methods of reducing the PAPR of a signal without sacrificing efficiency of the PA.

SUMMARY

It is an object of the present disclosure to provide an improved method for reducing the PAPR for single carrier signals.

In a first aspect, there is provided a method for receiving data at a computing device over a network. In a first step, the computing device receives a signal that has been clipped by the transmitter. As a second step, the computing device recovers a signal from the clipped signal with a recovery module configured on the computing device. The recovery module comprises a neural network trained to recover signals from clipped signals. As a third step, the signal may be processed by the computing device to decode the data. In embodiments of the present disclosure, to install a module on a device is an example to get the module configured on the device.

In a second aspect, there is provided a computing device comprising a communications subsystem and a processor. The communications subsystem and the processor cooperate to perform the following steps. In a first step, the computing device receives a signal that has been clipped by the transmitter. As a second step, the computing device recovers a signal from the clipped signal with a recovery module configured on the computing device. The recovery module comprises a neural network trained to recover signals from clipped signals. As a third step, the signal may be processed by the computing device.

In a third aspect, there is provided a non-transitory computer readable medium having stored thereon executable code for execution by a processor of a computing device. The executable code comprises instructions causing the computing device to perform the following steps. In a first step, the computing device receives a signal that has been clipped by the transmitter. As a second step, the computing device recovers a signal from the clipped signal with a recovery module configured on the computing device. The recovery module comprises a neural network trained to recover signals from clipped signals. As a third step, the signal may be processed by the computing device.

By using a trained neural network to recover a signal from a clipped signal, more aggressive clipping may be performed by the transmitter without preventing the receiver to properly reconstruct the signal from the clipped signal. This, in turn allows for a reduction of the PAPR and greater energy efficiency at the computing device.

According to a first implementation of the first aspect, the second aspect, or the third aspect, the neural network is trained with pairs of training signals. Each pair of training signals comprises an original signal and a clipped signal.

The neural network is trained to reconstruct signals from clipped signal. Each pair of training signals on which the neural network is trained comprises a clipped signal and the original signal from which the corresponding clipped signal was produced. This allows the neural network to train to properly reconstruct a signal from a clipped signal.

According to some examples of the first implementation of the first aspect, the second aspect, or the third aspect, the neural network is trained to minimize the Mean-Square-Error (MSE) between a recovered signal and a training original signal. The recovered signal is computed in a forward pass of the neural network based on a training clipped signal corresponding to the training original signal.

During training of the neural network, the neural network attempts to produce a signal from the clipped signal which is as close as possible to the original signal. This may be measured using the MSE method.

According to some examples of any preceding implementation of the first aspect, the second aspect, or the third aspect, or the first aspect, the second aspect or the third aspect as such, the computing device further determines a signaling context for the clipped signal and configures the recovery module with the signaling context.

The signaling context may affect how a clipped signal is recovered. Therefore, the recovery module may be configured to know the signaling context in order to better recover a signal from a clipped signal based on the signaling context.

According to some examples of any preceding implementation of the first aspect, the second aspect, or the third aspect, or the first aspect, the second aspect or the third aspect as such, the neural network is trained based on a plurality of signaling contexts.

By training the neural network for many signaling contexts, the neural network may be capable of recovering clipped signals more efficiently for each signaling context for which it is trained.

According to some examples of any preceding implementation of the first aspect, the second aspect, or the third aspect, or the first aspect, the second aspect, or the third aspect as such, the signaling context comprises at least one of constellation size, channel conditions, or power level.

According to some examples of any preceding implementation of the first aspect, the second aspect, or the third aspect, or the first aspect, the second aspect, or the third aspect as such, processing the signal comprises demapping the signal with a demapping module of the computing device.

The clipped signal is recovered with the recovery module and then it is demapped.

According to some examples of any preceding implementation of the first aspect, the second aspect, or the third aspect, or the first aspect, the second aspect, or the third aspect as such, the neural network is trained prior to installation on the computing device.

The neural network may be trained offline in order to be operational when it is installed on the computing device.

According to some examples of any preceding implementation of the first aspect, the second aspect, or the third aspect, or the first aspect, the second aspect, or the third aspect as such, the computing device transmits the clipped signal and the signal to a server for training of a remote neural network.

The offline version of the neural network may be continuously trained with new data. As the computing device generates data during its operation, this data may be shared for training of the offline neural network.

According to some examples of any preceding implementation of the first aspect, the second aspect, or the third aspect, or the first aspect, the second aspect, or the third aspect, as such, the computing device receives updates for the neural network from a server and applies the updates to its own neural network.

As the offline version of the neural network is trained further, new updated versions of the neural network may perform better than the version of the neural network installed on the computing device. The computing device may install new versions of the neural network to improve its performance.

BRIEF DESCRIPTION OF THE DRAWINGS

The present disclosure will be better understood with reference to the drawings in which.

DETAILED DESCRIPTION

Figure 1:
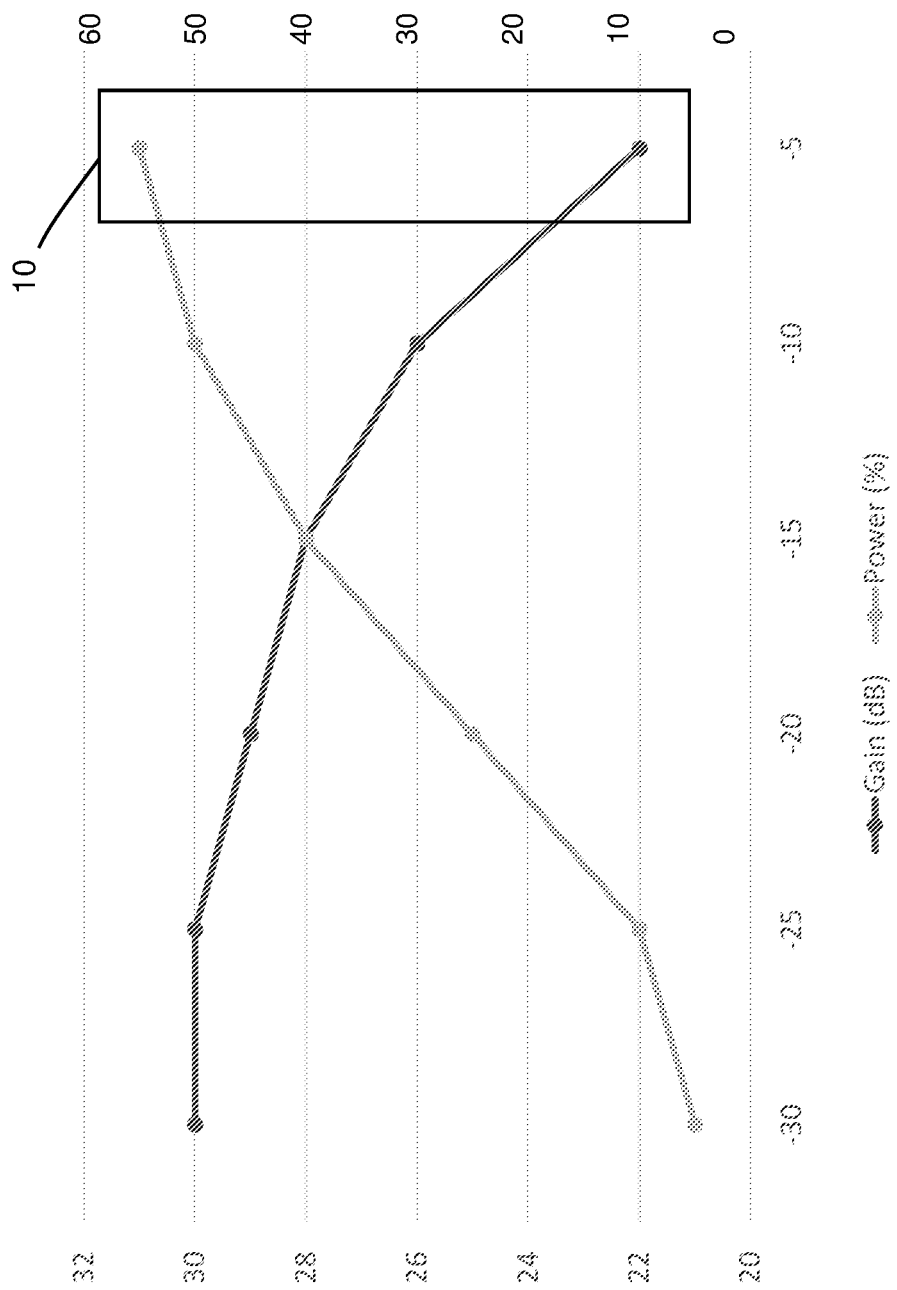
FIG. 1 is a diagram illustrating the relationship between efficiency of a power amplifier and gain.

Reference is made to FIG. 1, which illustrates the trade-off for power amplifiers as a graph. The X axis represents the input power for a power amplifier, and the Y axis represents both the gain and the efficiency of the power amplifier. As can be seen from FIG. 1, the gain is higher when the efficiency is lower, and the gain is lowest when the efficiency is highest, as highlighted by frame 10.

Figure 2:
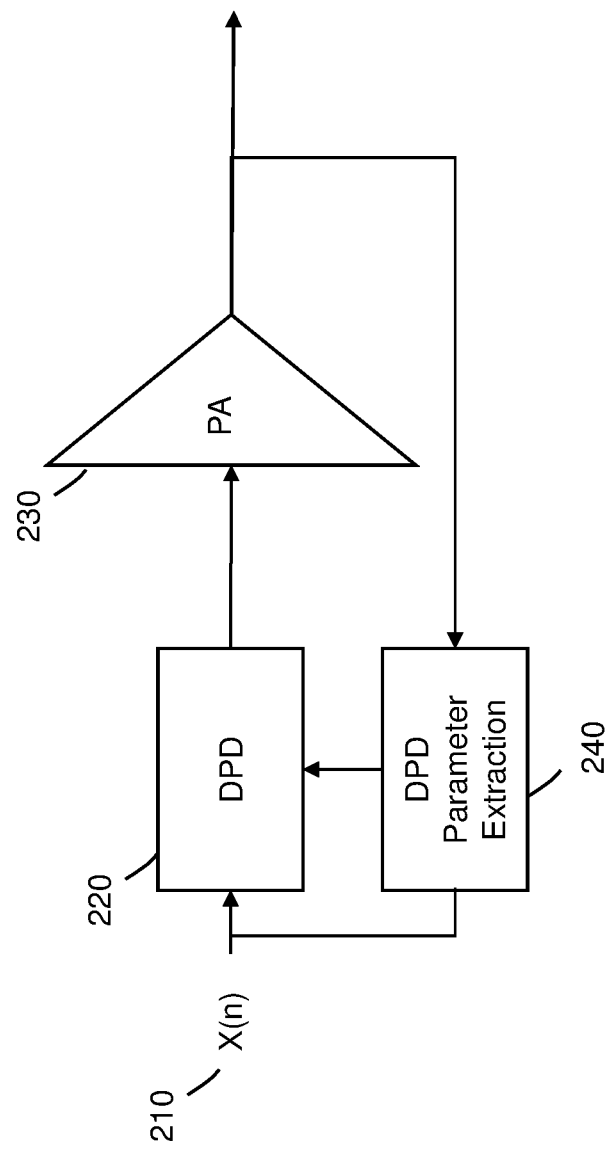
FIG. 2 is a block diagram illustrating an implementation of Digital Predistortion (DPD) through the Indirect Learning Architecture.

Reference is now made to FIG. 2. FIG. 2 illustrates a typical implementation of DPD through the Indirect Learning Architecture 200, where an input signal 210 is predistorted by a DPD module 220. The DPD in the forward path is built by feeding the output signal of the power amplifier 230 to a DPD extraction block 240 in the feedback path. Once the DPD is built in this block, it is copied to the DPD block in the forward path 220.

In DPD, the signal is pre-distorted to compensate in advance for the distorting effect of the power amplifier. Ideally, the pre-distortion of the DPD and the distortion of the power amplifier cancel each other out, producing a signal which is a more accurate representation of the input signal. This is achieved by analyzing the output of the power amplifier at 240. Specifically, at block 240, the power amplified output is analyzed to extract DPD parameters. These DPD parameters are passed back to DPD module 220 and allow the DPD module 220 to pre-distort the input signal 210 in accordance with the distorting effects of the power amplifier.

While DPD can be effective in some situations, its practical implementation is expensive, and the scalability of DPD solutions to higher-order systems has proven difficult. Such systems include Multiple-Input-Multiple-Output (MIMO), Massive MIMO (mMIMO), multi-band (MB) systems and any combination thereof, all of which are heavily utilized in fifth-generation (5G) systems. As a result, alternative approaches to DPD are needed to counteract the higher PAPR of next-generation New Radio (NR) signals.

Approaches have been developed to implement DPD in the frequency domain, in order to reduce the observation bandwidth and the sampling rate requirements.

Other PAPR reduction schemes include clipping, companding, constellation-manipulation, precoding and phase rotation, among others.

Clipping is simple to implement and provides effective PAPR reduction but creates difficulties for the receiver side to properly reconstruct the signal. Constellation-manipulation schemes may also provide effective PAPR reduction but are not applicable to higher-order modulation schemes such as larger Quadrature Amplitude Modulation (QAM) schemes. Rotation-based methods such as Partial Transmit Sequence (PTS) and Selected Mapping (SLM) may also be effective, but are expensive to implement and require the transmission of additional information to the receiver. Additional methods such as Tone Reservation (TR) and Tone Injection (TI) are also available.

Figure 3:
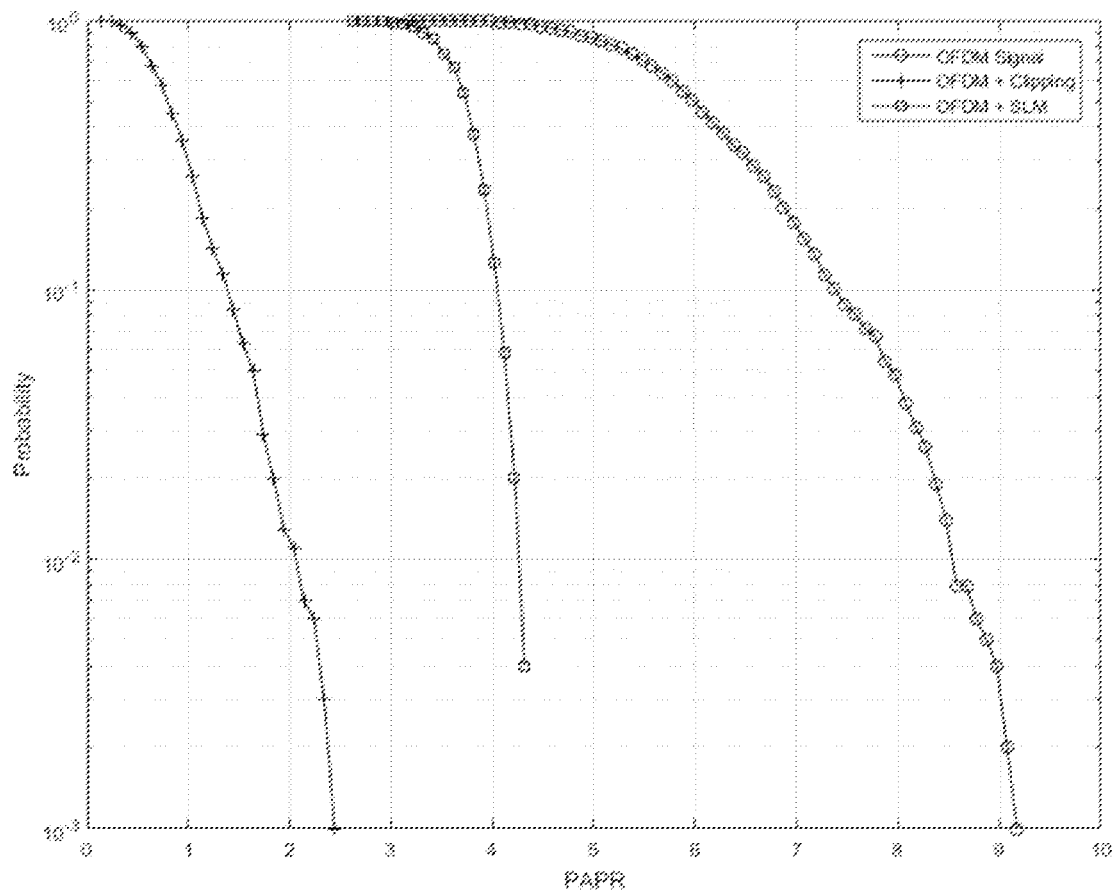
FIG. 3 is a graph illustrating the effect of various techniques on PAPR.

Differences in performance between clipping and SLM are shown in FIG. 3.

Specifically, FIG. 3 shows a graph in which the X axis represents a PAPR and the Y axis represents the probability of obtaining a PAPR for a given scheme. As can be seen from FIG. 3, the probability of a high PAPR when using clipping is much reduced compared to just using OFDM or SLM.

Machine Learning (ML) methods have also been used to implement PAPR reduction methods such as PTS and SLM, through the use of Neural Network (NN) architectures including autoencoders (AE). While benefits may be achieved with such techniques, the need to implement PTS and SLM on the transmitter comes at a high cost.

The methods rely on multiplying sequences with complex phase factors and then combining the resulting signals in a domain such as the time domain or the frequency domain. This results in a lack of direct control over the PAPR at the transmitter. While PTS and SLM produce signals which are more easily recovered at the receiver than clipping, the PAPR reduction achieved by PTS and SLM is not as effective as that provided by clipping.

While many techniques have been developed for Orthogonal Frequency Division Modulation Multiplexing (OFDM), such techniques are not optimized for Single-Carrier (SC) systems. While OFDM has higher PAPR than SC systems, SC systems are the standard choice for implementing backhaul transmission and microwave line-of-sight (LOS) systems. Some solutions for SC systems directly adapt simple solutions used for OFDM to SC systems, despite significant differences between the two. For example, rotation-based methods are sometimes used despite being known to underperform in an SC scenario.

In SC systems, pulse-shaping filters are used to ensure the signals comply with the standards and requirements set for the links under consideration. These filters, such as the Raised-Cosine (RC) and Root-Raised Cosine (RRC) filters, are effective at mitigating inter-symbol interference (ISI) but also increase the PAPR of the signals. Furthermore, SC systems also deploy multiplexing methods such as Interleaved-, Distributed- or Localized-Frequency Division Multiple Access (IFDMA, DFDMA, LFDMA) which are necessary for these configurations, but also increase the PAPR by anywhere from 2 to 4 dB. Therefore, PAPR reduction solutions for SC systems are needed.

Further, existing PAPR reduction methods are static and do not account for changes in signaling conditions such as changes in the size of the signal constellation. Existing PAPR reduction solutions also lack flexibility and may not be applicable when changes in the system architecture are introduced.

Accordingly, there is a need for PAPR reduction solutions that are adaptable and modular.

The present disclosure provides an improved PAPR reduction method for single carriers which has a low implementation cost, adaptable to different situations, and which is compatible with frequency-domain DPD solutions.

Specifically, the present disclosure provides a method which uses Machine Learning (ML) to improve clipping at the transmitter thereby avoiding the high implementation costs of SLM and PTS. The ML may be adaptable to a variety of signaling conditions such as constellation sizes and transmitted power levels, by training the ML for different scenarios.

The solution presented herein may also be used with transceivers that are implemented in the frequency domain, and allows for user control of the PAPR performance at the transmitter side.

According to at least one embodiment of the present disclosure, there is provided an ML-based clipping module at the transmitter side, and an ML-based recovery module at the receiver side.

Figure 4A:
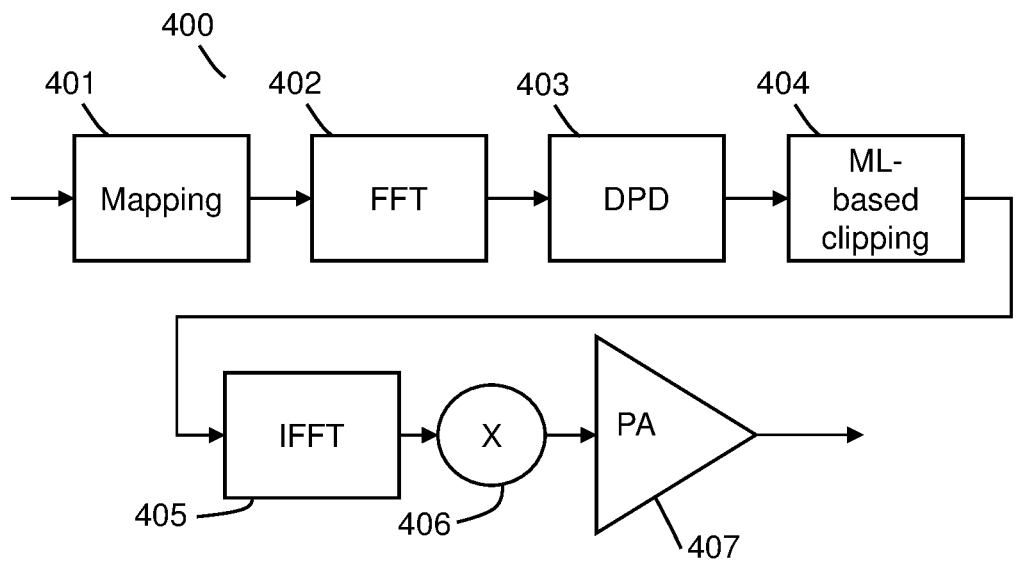
FIG. 4A is a flow diagram illustrating signal processing at the transmitter, according to at least one embodiment of the present disclosure.

Reference is now made to FIG. 4A, which illustrates a flow diagram 400 of signal processing at the transmitter side according to at least one embodiment of the present disclosure. As seen in FIG. 4, a signal is fed to a mapping module 401 for mapping symbols of the signal to a code for transmission across the channel. The signal is then fed to a Fast Fourier Transform (FFT) module 402 which converts the signal into the frequency domain.

According to at least some embodiments, the signal is then fed to a DPD module 403 where DPD may be applied to the signal.

After passing through DPD module 403, the signal may be expressed using the memory polynomial model (MPM) in the frequency domain:

$$y[k] = \sum_q^Q \sum_m^M \gamma_{q,m} e^{\frac{-2j\pi mk}{K}} Y_q[k]$$

Where $Y_q[k]$ is the set of basis functions given as $Y_1[k]=x[k]$ $Y_2[k]=(x[k])\circledast(x[-k])^*$ $Y_3[k]=(x[k])\circledast(x[-k])^*\circledast(x[k])$ The signal is then processed by the ML-based clipping module 404. The ML-based clipping module is trained prior to operation as will be described in greater detail below. The clipped signal is then fed to Inverse Fast Fourier Transform (IFFT) module 405 to convert the signal back to the time domain, passed through mixer 406, PA 407, and transmitted.

Figure 4B:
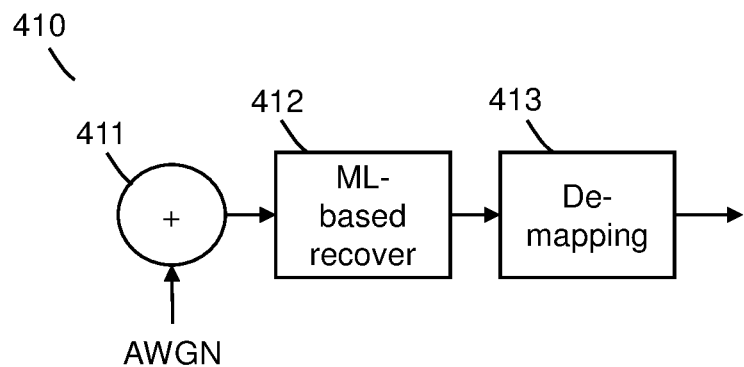
FIG. 4B is a flow diagram illustrating signal processing at the receiver, according to at least one embodiment of the present disclosure.

Reference is now made to FIG. 4B illustrating signal processing 410 at the receiver side. The signal is received at the receiving device. Optionally, Additive White Gaussian Noise may be added to the signal at block 411, and fed through ML-based recovery module 412. The ML-based recovery module 412 is trained prior to operation as will be described in greater detail below. The recovered signal is then passed to a de-mapping module 413 for decoding.

In this embodiment, the ML-based recovery module 412 at the receiver is trained to recover signals from their clipped signals, in order to enable PAPR reduction. On the transmitter side, the ML-based clipping module 404 is trained to clip signals dynamically.

Conventionally, the signal is clipped at a threshold which is fixed. However, the ML-based clipping module 404 clips the signal at a level which varies dynamically to meet a performance target. The ML-based clipping module 404 may adjust its clipping based on the conditions of the signal and power level used.

For example, during operation, the size of the signal constellation used may change, and the ML-based clipping module 404 may adjust its clipping of the signal as a result.

According to at least one other embodiment of the present disclosure, the ML-based clipping module 404 may adjust its clipping based on changes to the transmitter power level. In this scenario, although the PAPR of the signal may not change, the clipping level may be updated to respond to changes in behavior of the power amplifier resulting from a change to the transmitter power level.

Figure 5:
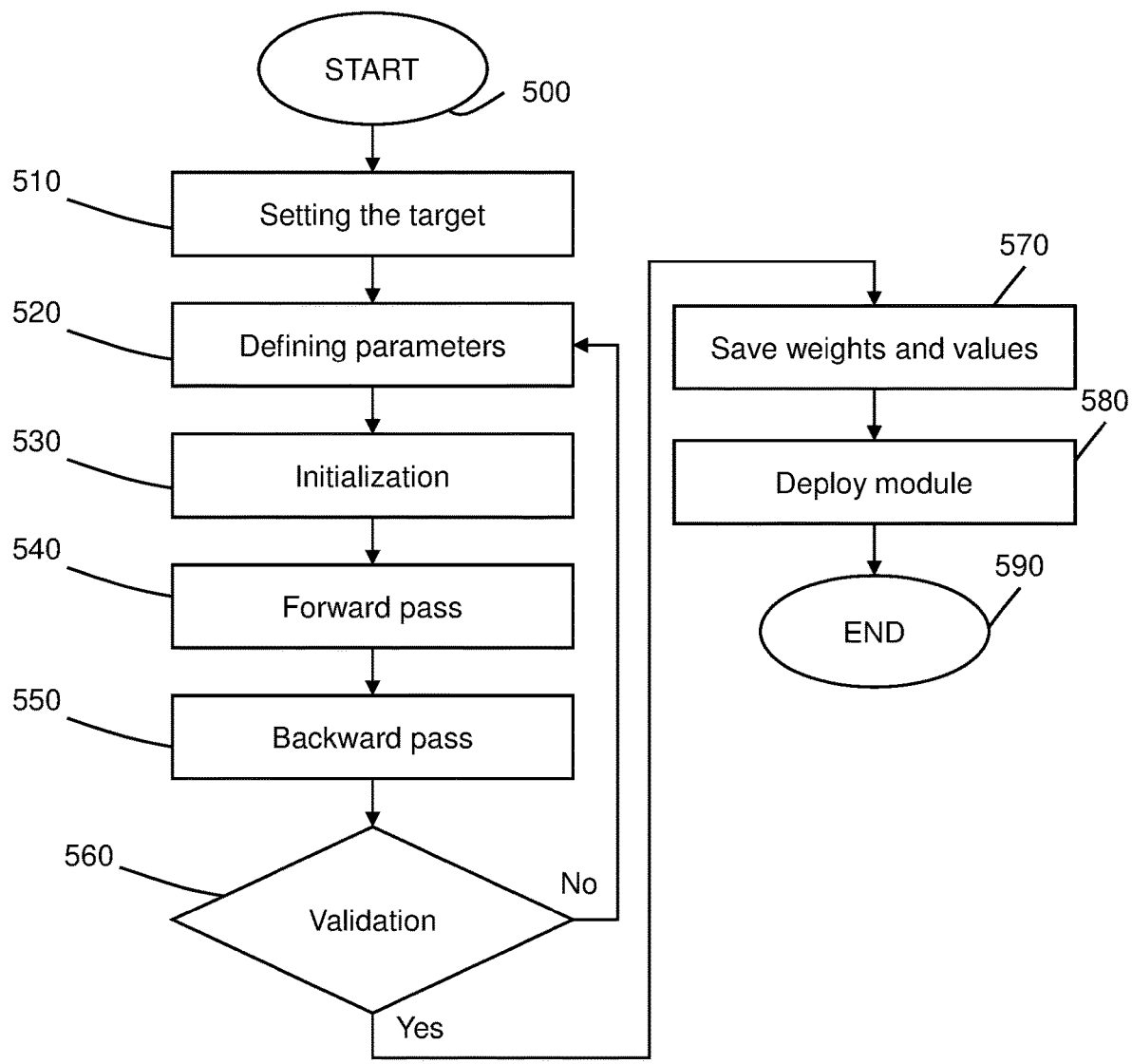
FIG. 5 is a flow diagram illustrating a method for training a machine-learning module according to at least one embodiment of the present disclosure.

Reference is now made to FIG. 5, which illustrates a process for training an ML-based module according to at least one embodiment of the present disclosure.

The method starts at block 500 and proceeds to block 510, in which a target is set. Specifically, an ML-based module according to the present disclosure uses machine-learning with a neural network. The function performed by a machine learning unit is defined by the goal it is trained to achieve. For example, a recovery module for a receiver has the goal of creating an approximation of the signal to recover. A clipping module has the goal of producing a suitably clipped signal from an unclipped signal. Other ML-based units may seek to perform other targets.

The method then proceeds to block 520, where the parameters of the machine learning implementation are defined. These parameters may include the number of neurons in the network, the number of network layers, the error target and any desired initial values for the neuron weights and values.

The method then proceeds to block 530, where the neural network is initialized. Specifically, a neural network is comprised of a plurality of nodes, and each node is assigned a value and a weight. During initialization, each node of the neural network is assigned an initial value and an initial weight. According to at least one embodiment, the initial values and initial weights may be randomized.

The method then proceeds to block 540 where an input signal is provided to the neural network and as the signal is passed along each node of the neural network, an output is computed. The process of feeding input data through a neural network in order to compute an output is called a "forward pass". The output may then be compared to a target value. For example, according to the present disclosure, when the input data represents a clipped signal, the output data should be as close to possible to the unclipped version of the signal. Alternatively, when the input data represents an unclipped signal, the output data should be as close as possible to a suitably clipped signal.

The method then proceeds to block 550 where the weight and value of each node in the neural network is updated based on the last forward pass. The process of updating the weight and value of each node after a forward pass is called a "backward pass". Any algorithm known in the art for performing a backward pass may be used.

Steps 540 and 550 may be repeated for any number of input and output values. For example, input signals and corresponding output signals of different constellation sizes may be used to train the ML-based recovery module to handle signals of various constellation sizes. Similarly, input signals and corresponding output signals of different power levels may be used to train the ML-based recovery modules. Similarly, for training the ML-based clipping module, input signals and their corresponding targets may have different constellation sizes, power levels, or other relevant characteristics.

Therefore, after block 550 the method proceeds to decision 560 where validation of the ML-based module is performed. For example, the performance of the ML-based module may be evaluated after each training cycle. The performance of an ML-based module may be expressed as a function selected to represent the objective of the module, as described in greater detail below.

When validation is unsuccessful, the method returns to block 520 in order to keep training the module. Otherwise, when validation is successful, the method proceeds to block 570 to save the weights and values of each node within the neural network. The ML-based module may then be deployed at block 580 to the application for which it is trained, with the weights and values saved at block 570. For example, an ML-based recovery module may be installed on a receiving device to recover clipped signals, and an ML-based clipping module may be installed on a transmitting device to clip signals.

The method then proceeds to block 590 and ends.

Generally, the ML-based recovery module should be trained with a plurality of inputs and outputs having different characteristics to enable the ML-based recovery module to successfully handle signals having such characteristics. These characteristics may comprise constellation size and power level, amongst others.

According to at least one embodiment of the present disclosure, the module being trained is an ML-based clipping module having the objective to produce a signal with the lowest PAPR. In other words, for a given input signal, the ML-based clipping module seeks to produce a clipped signal for which the PAPR is at a minimum. This may be expressed as follows:

$$J_{transmitter}(\theta) = \min(PAPR)$$

$\theta$ represents the set of values and weights in every node of the neural network, and $J_{transmitter}(\theta)$ is the transformation the neural network performs on a signal for a given $\theta$. During training, the neural network is adjusted (e.g., by updating the values and the weights of each node) so that the clipped signal produces the lowest PAPR possible, within a set of constraints. Therefore, once a signal is clipped in a forward pass, the resulting PAPR of the clipped signal is computed, and the weights and values of the neural network are adjusted in a backwards pass.

According to at least another embodiment of the present disclosure, the module being trained is an ML-based recovery module having the objective to produce an unclipped signal from a clipped signal. This may be expressed as follows:

$$J_{receiver}(\theta) = \min(MSE)$$

Again, $\theta$ represents the set of values and weights in every node of the neural network, and $J_{receiver}(\theta)$ represents the transformation the neural network performs on a signal for a given $\theta$. In this case however, the neural network seeks to minimize the Mean-Square-Error of the output signal, which may be calculated as follows:

$$MSE = \frac{1}{N}\sum_{n=1}^{N}(X_n - \hat{X}_n)^2$$

Here, N is the total number of data points from the signal being considered, $X_n$, is a data point on the target signal, and $\hat{X}_n$ is a corresponding data point on the signal created by the neural network.

Advantageously, by training the recovery module to recover a target signal from a clipped signal as described above, the recovery module may also compensate for other distortions of the signal, such as those due to modulator imbalance, residual amplifier nonlinearity, and others.

Figure 6:
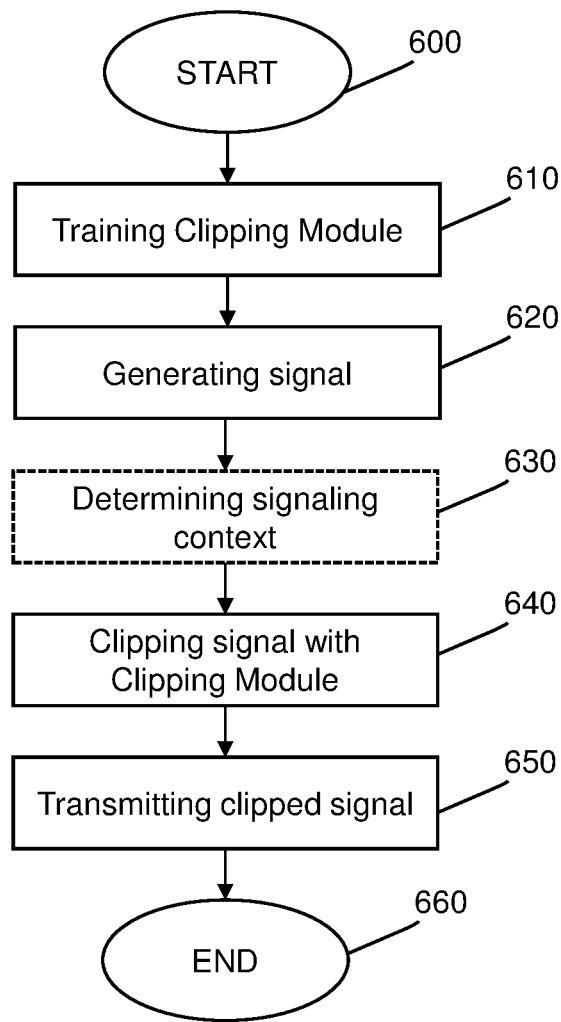
FIG. 6 is a flow diagram illustrating a method for transmitting data according to at least one embodiment of the present disclosure.

Reference is now made to FIG. 6, which illustrates a method for transmitting data according to at least one embodiment of the present disclosure.

The method of FIG. 6 may be performed by a transmitting device having installed thereon a version of a trained ML-based clipping module. Generally, the ML-based clipping module is trained prior to being installed on the transmitting device.

The method begins at block 600, and proceeds to block 610 where the clipping module is trained. Specifically, the clipping module comprises a neural network comprising a plurality of nodes. When a signal is fed to the neural network, the signal is processed according to weights and values of each node of the neural network. The neural network is trained as described above such that the weights and values are selected for a specific target. In the case of the neural network of the ML-based clipping module, the specific target may comprise the minimization of the PAPR of a signal by clipping of the signal. As discussed above, the training step may be performed prior to installing the clipping module on a transmitting device. However, the clipping module may also continue to be trained prior to installation on the transmitting device.

In at least some embodiments, the clipping module may be trained remotely and updates to the clipping module may be received at the transmitting device periodically.

Once the clipping module is trained and installed on the transmitting device, the transmitting device may generate a message for transmission at block 620.

Optionally, the method then proceeds to block 630 where the signaling context is determined. The signaling context may include a number of factors such as constellation size, power level, and channel conditions, amongst others. In some embodiments, the clipping module may then be configured with the signaling context.

The signal is then passed to the clipping module for clipping at block 640. According to at least one embodiment of the present disclosure, the signal is fed to the neural network of the clipping module and processed in a forward pass. The output of the neural network is a clipped version of the signal and for which the PAPR has been minimized. Specifically, by training the clipping module to clip signals so as to minimize the PAPR, the clipped signal output by the clipping module is clipped so as to produce as small a PAPR as possible.

The clipping module may be configured according to the current signaling context. For example, the clipping module may be configured based on a constellation size used, power levels, or a signal to noise ratio of the channel, amongst others.

The clipped signal is then transmitted to a recipient device at block 650 and the method ends at block 660.

Figure 7:
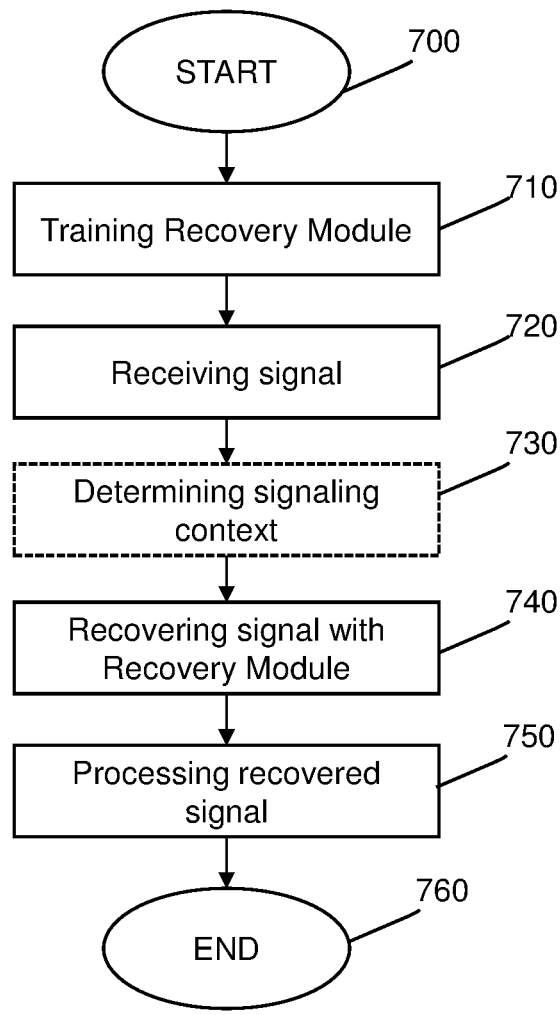
FIG. 7 is a flow diagram illustrating a method for receiving data according to at least one embodiment of the present disclosure.

Reference is now made to FIG. 7, which illustrates a method for receiving data according to at least one embodiment of the present disclosure.

The method of FIG. 7 may be performed by a receiving device having installed thereon a version of a trained ML-based recovery module. Generally, the ML-based recovery module is trained prior to being installed on the receiving device.

The method begins at block 700, and proceeds to block 710 where the recovery module is trained. Specifically, the recovery module comprises a neural network comprising a plurality of nodes. When a signal is fed to the neural network, the signal is processed according to weights and values of each node of the neural network. The neural network is trained as described above such that the weights and values are selected for a specific target. In the case of the neural network of the ML-based recovery module, the specific target may comprise the minimization of a least square error of the reconstructed signal with respect to a reference signal. As discussed above, the training step may be performed prior to installing the recovery module on a receiving device. However, the recovery module may also continue to be trained following installation on the receiving device.

In at least some embodiments, the recovery module may be trained remotely and updates to the recovery module may be received at the receiving device periodically.

Once the recovery module is trained and installed on the receiving device, the receiving device may receive a message at block 720.

Optionally, the method proceeds to block 730 where the signaling context is determined. The signaling context may comprise relevant characteristics of the message for which the ML-based recovery module is pre-trained. The ML-based recovery module may then be provided with these characteristics prior to performing recovery on the clipped message. For example, the recovery module may be configured based on a constellation size used, power levels, or a signal to noise ratio of the channel, amongst others.

The signal is then passed to the recovery module at block 740. According to at least one embodiment of the present disclosure, the signal is fed to the neural network of the recovery module and processed in a forward pass. The output of the neural network is a reconstruction version of the clipped signal. Specifically, by training the recovery module to reconstruct clipped signals as described above, the reconstructed signal output by the recovery module is as close as possible to the original unclipped signal.

The recovered signal is then processed by the receiving device at block 750 and the method ends at block 760.

According to at least some embodiments of the present disclosure, signal data processed by the recovery module is stored and transmitted to a remote computing device at a convenient time. This data may then be used by the remote computing device for further training of the recovery module. For example, the signal data processed by the recovery module could be transmitted to the remote computing device periodically, or upon request from the remote computing device.

The above-described embodiments have been shown to provide benefits over prior art techniques of reducing the PAPR. Specifically, experiments have shown that the ML-based recovery module according to embodiments of the present disclosure can recover heavily clipped signals, up to 10 decibels. This in turn allows the transmitter to clip the signal heavily and thereby reduce the PAPR more significantly than existing solutions.

Further, the present disclosure takes advantage of neural networks and their ability to model and recover from non-linear distortive phenomena. In contrast, prior art solutions suffer from the difficulty of recovering clipped signals. However, by improving the ability of the receiver to correct for clipping, greater PAPR reduction may be achieved.

Figure 8:
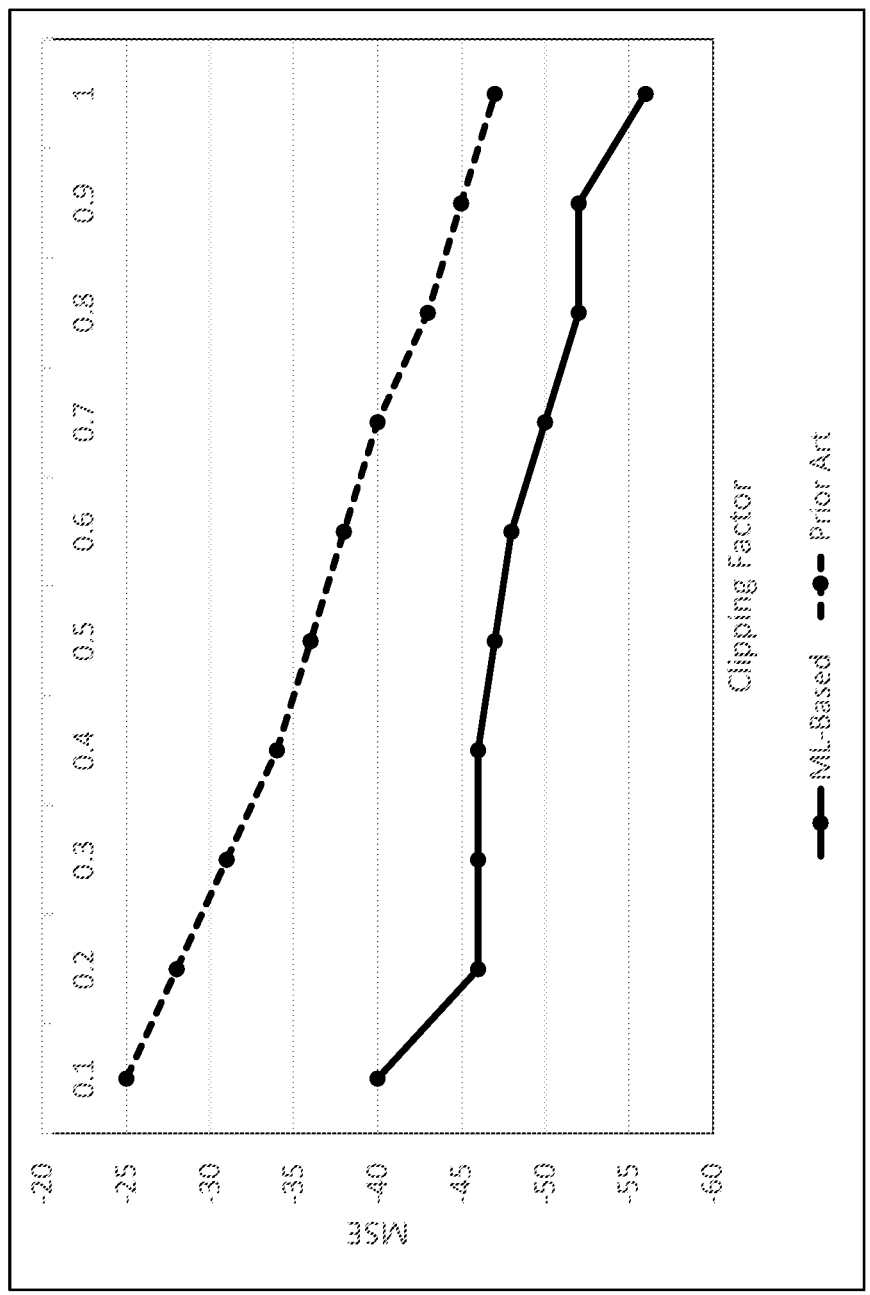
FIG. 8 is a chart of clipping recovery performance comparing prior art solutions with solutions of the present disclosure.

FIG. 8 demonstrates the ability of an ML-based receiver module to outperform traditional recovery methods in recovering a clipped signal. Specifically, FIG. 8 plots out the Mean Square Error of a recovered signal compared to the original signal with different clipping factors. As shown in FIG. 8, a clipping factor indicate the percentage of a signal's original peak power. For example, a clipping factor of 0.2 indicates that the signal is clipped at 20% of its original power. The threshold for acceptable signal recovery performance is generally considered to be around −45 dB or lower, and it can be seen from FIG. 8 that the proposed solution can achieve this performance at extreme clipping values (e.g., 0.2) compared to prior art methods which can only achieve this recovery threshold at a clipping factor of 0.9.

The solutions of the present disclosure also provide a low implementation cost. As the ML-based clipping and recovery modules are trained a priori and offline, its implementation on devices has a low implementation cost.

Furthermore, prior art clipping recovery solutions are tailored to specific applications and their structure and design is closely tied to the transmitter configurations, signaling levels, power levels, constellation sizes and other variables. As a result, these solutions cannot be easily adapted to changes in signaling conditions and configurations. In contrast, the proposed ML based recovery module is environment-independent, and can be used in a wide variety of situations, comprising different signaling levels, power levels, and constellation sizes, amongst others.

The solution proposed by the present disclosure operates independently of other pre-existing system components and does not require changes to the transmitter or receiver architecture. Specifically, the ML-based clipping module and the ML-based recovery modules may be installed on a transmitter and a receiver, respectively, as long as they have been trained prior to installation with a sufficiently large set of training data matched with a set of output data.

An ML-based recovery module according to the present disclosure may also compensate for any generalized non-linear or linear distortion. By training the ML-based recovery module to recover a clipped signal, the recovery module also learns to recover from other distortive effects such as noise, channel effects, power amplifier distortion and others. The transmitter-side ML-based clipping module may also be used to implement digital pre-distortion operations for added efficiency.

In prior art solutions, the clipping is done at the transmitter in a static manner by specifying the amount of clipping to be performed on the signal. In contrast, the ML-based clipping module according to the present disclosure allows for adaptive and intelligent clipping by adjusting the amount and nature of the clipping to the characteristics of the signal used.

According to at least some embodiments of the present disclosure, the transmitter side operates conventionally, i.e., without an ML-based clipping module, but the receiver side operates with an ML-based recovery module. The cost for implementing such embodiments is lower, due to the lack of an ML-based clipping module, but the flexibility and performance is reduced in relation to embodiments with an ML-based clipping module at the transmitter.

As discussed above, an ML-based recovery module according to the present disclosure may recover signals from different non-linear effects, including conventional, non-ML-based, clipping.

Figure 9:
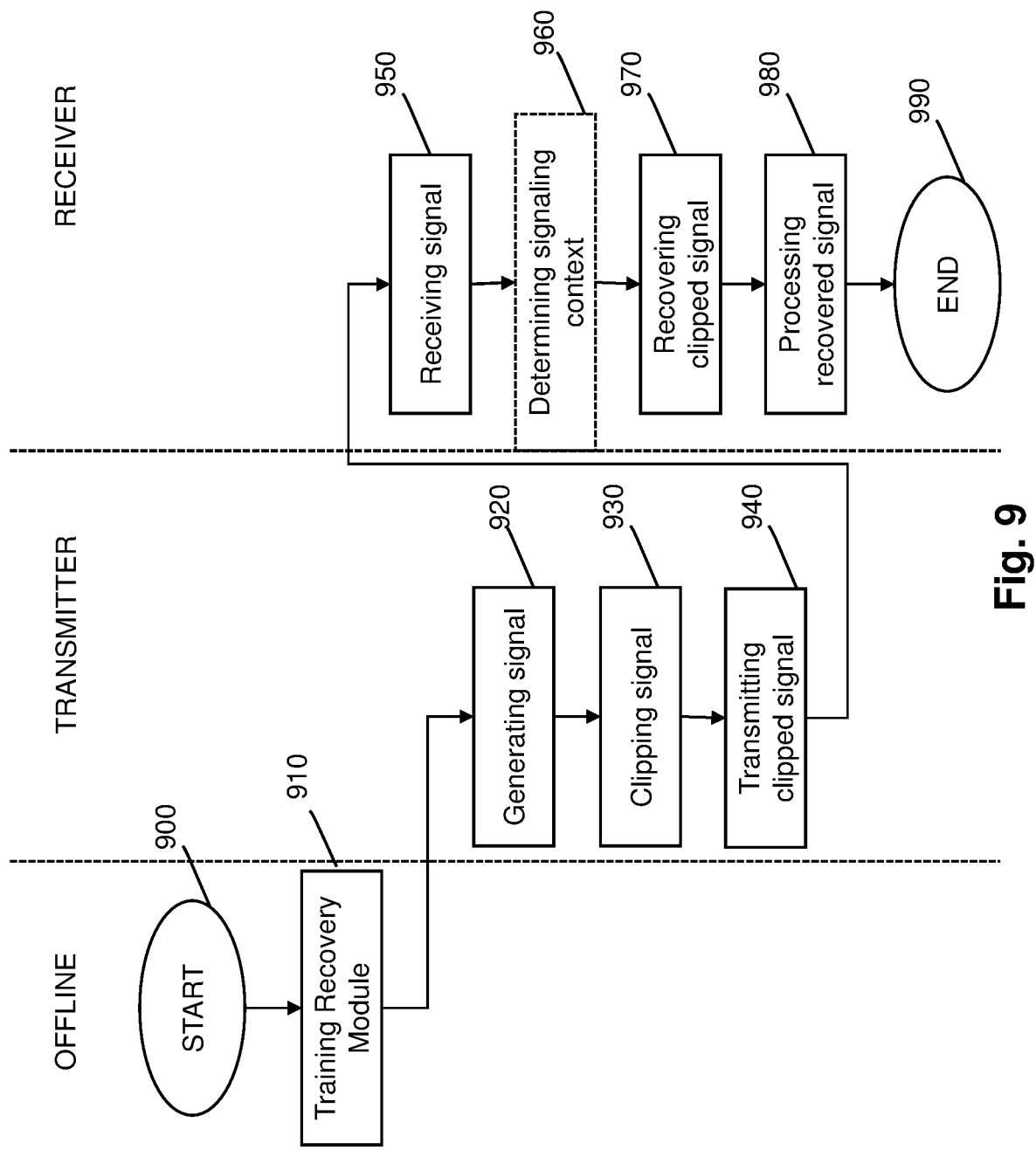
FIG. 9 is a flow diagram illustrating a method for transmitting and receiving data according to at least one embodiment of the present disclosure.

In embodiments with no ML-based clipping module, the ML-based recovery module may be trained and operated similarly to embodiments with an ML-based clipping module. Reference is made to FIG. 9 which illustrates a method for transmitting and receiving data according to at least some embodiments of the present disclosure.

The method begins at block 900, and proceeds to block 910 where the recovery module is trained. Specifically, the recovery module comprises a neural network comprising a plurality of nodes. When a signal is fed to the neural network, the signal is processed according to weights and values of each node of the neural network. The neural network is trained as described above such that the weights and values are selected for a specific target. In the case of the neural network of the ML-based recovery module, the specific target may comprise the minimization of a least square error of the reconstructed signal with respect to a reference signal. As discussed above, the training step may be performed offline, prior to installing the recovery module on a receiving device. However, the recovery module may also continue to be trained following installation on the receiving device.

In at least some embodiments, the recovery module may be trained remotely and updates to the recovery module may be received at the receiving device periodically.

The transmitting device may then generate a message for transmission at block 920.

The signal is then passed to the clipping module of the transmitter at block 930. According to at least one embodiment of the present disclosure, the clipping module of the transmitter is a conventional, non-ML-based, clipping module. The transmitter clipping module may clip the signal according to any suitable method as would be appreciated by those skilled in the art.

The clipped signal is then transmitted to a receiving device at block 940.

The receiving device may then receive the message at block 950.

Optionally, the method proceeds to block 960 to determine the signaling context. The signaling context may include relevant characteristics of the message for which the ML-based recovery module is pre-trained. The ML-based recovery module may then be provided with these characteristics prior to performing recovery on the clipped message. For example, the recovery module may be configured based on a constellation size used, power levels, or a signal to noise ratio of the channel, amongst others.

The signal is then passed to the recovery module at block 970. According to at least one embodiment of the present disclosure, the signal is fed to the neural network of the recovery module and processed in a forward pass. The output of the neural network is a reconstruction version of the clipped signal. Specifically, by training the recovery module to reconstruct clipped signals as described above, the reconstructed signal output by the recovery module is as close as possible to the original unclipped signal.

The recovered signal is then processed by the receiving device at block 980 and the method ends at block 990.

According to at least some embodiments, signal data processed by the recovery module is stored and transmitted to a remote computing device at a convenient time. This data may then be used by the remote computing device for further training of the recovery module. For example, the signal data processed by the recovery module could be transmitted to the remote computing device periodically, or upon request from the remote computing device.

In the embodiments in which clipping is performed conventionally at the transmitter without an ML-based clipping module, strong performance may also be achieved. Specifically, by using the ML-based recovery module, the signal may be more heavily clipped at the transmitter without compromising recovery of the original message, thereby providing greater PAPR reduction. An ML-based recovery module according to the present disclosure may be added to a receiver device regardless of the receiver architecture, and may be used over any channel condition.

The embodiments described herein provide the advantage of being applicable to technologies and configurations other than the ones oriented towards wireless transmission or microwave backhaul. One prominent example is optical communication systems; as optical transmission is similar in concept to Single-Carrier transmission. Optical systems are projected to play a key role in 5G systems and beyond, as they will handle the backhaul in many parts of the network and going forward will see increased use as well. Due to the modularity of the solutions described in the present disclosure, and the possibility of implement these solutions in frequency-domain architectures, these embodiments may also be useful in future networks beyond 5G (i.e., systems such as 6G). These embodiments may also be used in transceiver configurations such as multi-band, MIMO arrangements in either the time or the frequency domain.

Figure 10:
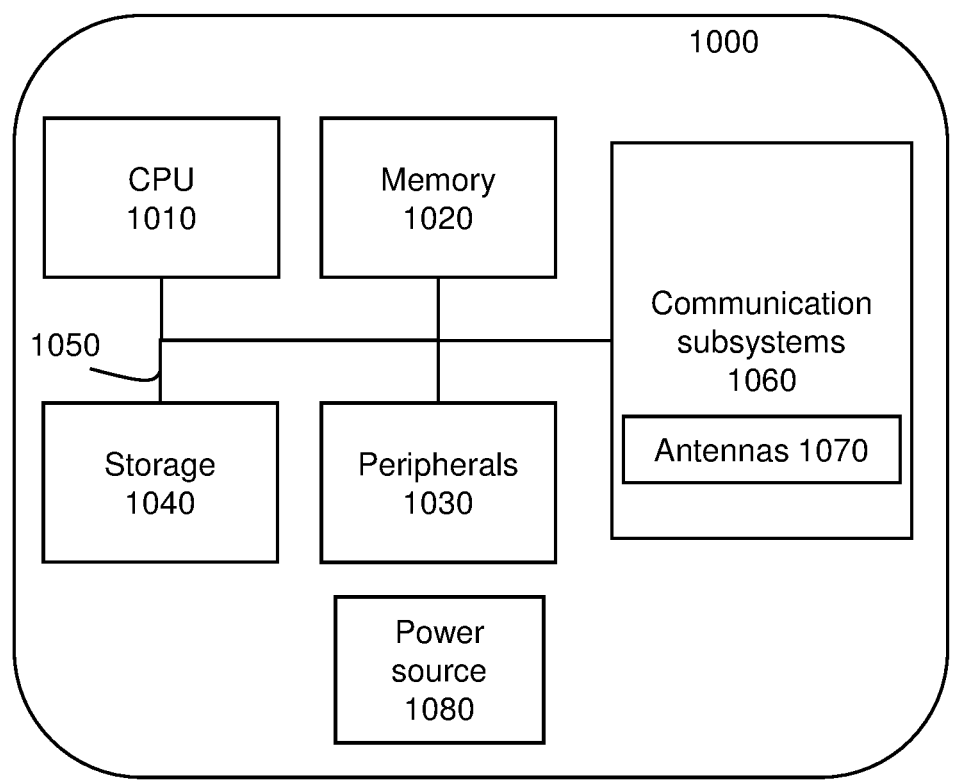
FIG. 10 is a block diagram illustrating an exemplary device for implementing embodiments of the present disclosure.

The above functionality may be implemented on any one or combination of computing devices. FIG. 10 is a block diagram of a computing device 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The computing device 1000 may comprise a central processing unit (CPU) 1010, memory 1020, a mass storage device 1040, and peripherals 1030. Peripherals 1030 may comprise, amongst others one or more input/output devices, such as a speaker, microphone, mouse, touchscreen, keypad, keyboard, printer, display, network interfaces, and the like. Communications between CPU 1010, memory 1020, mass storage device 1040, and peripherals 1030 may occur through one or more buses 1050.

The bus 1050 may be one or more of any type of several bus architectures including a memory bus or memory controller, a peripheral bus, video bus, or the like. The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs.

The mass storage device 1040 may comprise any type of storage device configured to store data, programs, and other information and to make the data, programs, and other information accessible via the bus. The mass storage device 1040 may comprise, for example, one or more of a solid state drive, hard disk drive, a magnetic disk drive, an optical disk drive, or the like.

The computing device 1000 may also include one or more network interfaces (not shown), which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network, for data processing and communications with remote devices, such as other processing units, the Internet, remote storage facilities, or the like.

The computing device 1000 represents any suitable device for wireless operation and may include such devices (or may be referred to) as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. A network element 110 may also represent devices such as user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a user equipment, a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation computing devices 1000 may be referred to using other terms.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In particular, example clauses may include:

AA. A method at a computing device for transmitting data over a network, comprising: generating a signal for transmission from the data; clipping the signal with a clipping module, the clipping module being configured on the computing device and comprising a neural network trained to produce clipped signals from unclipped signals; and transmitting the clipped signal to a receiver.

The generated signal is clipped using a clipping module comprising a neural network trained to produce clipped signals. The use of the neural network allows for more intelligent clipping, allowing the clipping to be tailored to various scenarios.

BB. The method of clause AA wherein the neural network is trained with training signals.

CC. The method of clause BB wherein the neural network is trained to clip training signals in order to minimize the Peak-to-Average Power Ratio (PAPR) of a training clipped signal, the training clipped signal being computed in a forward pass of the neural network based on a training signal of the training signals.

The clipping is performed in order to minimize the PAPR. Accordingly, the neural network may be trained to minimize PAPR.

DD. The method of clause AA further comprising: determining a signaling context; configuring the clipping module with the signaling context.

The clipping module may be trained to clip signals in various signaling contexts. This allows the clipping module to adjust its behavior depending on the signaling context.

EE. The method of clause DD wherein the neural network is trained with a plurality of signaling contexts.

By training the neural network with a plurality of signaling contexts, the neural network will be better capable of handling such signaling contexts.

FF. The method of clause DD wherein the signaling context comprises at least one of a constellation size, a power level, and channel conditions.

GG. The method of clause AA further comprising, prior to clipping the signal with the clipping module, applying digital predistortion (DPD) to the signal.

DPD may be applied prior to clipping the signal to further reduce the PAPR.

HH. The method of clause AA wherein the neural network is trained prior to installation on the computing device.

The neural network is trained prior to installation in order to be operative when it is installed.

II. The method of clause AA further comprising transmitting the signal and the clipped signal to a server for training of a remote neural network.

Data collected during operation of the clipping module may be collected in order to improve the performance of the clipping module.

JJ. The method of clause AA further comprising: receiving, from a server, updates for the neural network; and applying, to the neural network, the updates.

The clipping module's neural network may be updated with a newer version or a version which has been subjected to additional training.

KK. A computing device comprising: a communications subsystem and a processor, wherein the communications subsystem and the processor cooperate to: generate a signal for transmission; clip the signal with a clipping module, the clipping module being configured on the computing device and comprising a neural network trained to produce clipped signals from unclipped signals; and transmit the clipped signal to a receiver.

The generated signal is clipped using a clipping module comprising a neural network trained to produce clipped signals. The use of the neural network allows for more intelligent clipping, allowing the clipping to be tailored to various scenarios.

LL. A computing device according to clause KK wherein the neural network is trained with training signals.

MM. The computing device of clause LL wherein the neural network is trained to clip training signals in order to minimize the Peak-to-Average Power Ratio (PAPR) of a training clipped signal, the training clipped signal being computed in a forward pass of the neural network based on a training signal of the training signals.

The clipping is performed in order to minimize the PAPR. Accordingly, the neural network may be trained to minimize PAPR.

NN. The computing device of clause KK wherein the communications subsystem and the processor further cooperate to: determine a signaling context; and configure the clipping module with the signaling context.

The clipping module may be trained to clip signals in various signaling contexts. This allows the clipping module to adjust its behavior depending on the signaling context.

OO. The computing device of clause NN wherein the neural network is trained with a plurality of signaling contexts.

By training the neural network with a plurality of signaling contexts, the neural network will be better capable of handling such signaling contexts.

PP. The computing device of clause NN wherein the signaling context comprises at least one of a constellation size, a power level, and channel conditions.

QQ. The computing device of clause KK wherein the communications subsystem and the processor further cooperate to: prior to clipping the signal with the clipping module, apply digital predistortion (DPD) to the signal.

DPD may be applied prior to clipping the signal to further reduce the PAPR.

RR. The computing device of clause KK wherein the neural network is trained prior to installation on the computing device.

The neural network is trained prior to installation in order to be operative when it is installed.

SS. The computing device of clause KK wherein the communications subsystem and the processor further cooperate to transmit the signal and the clipped signal to a server for training of a remote neural network.

Data collected during operation of the clipping module may be collected in order to improve the performance of the clipping module.

TT. The computing device of clause KK wherein the communications subsystem and the processor further cooperate to receive, from a server, updates for the neural network; and apply, to the neural network, the updates.

The clipping module's neural network may be updated with a newer version or a version which has been subjected to additional training.

UU. A non-transitory computer readable medium having stored thereon executable code for execution by a processor of a computing device, the executable code comprising instructions for: generating a signal for transmission; clipping the signal with a clipping module, the clipping module being configured on the computing device and comprising a neural network trained to produce clipped signals from unclipped signals; and transmitting the clipped signal to a receiver.

The generated signal is clipped using a clipping module comprising a neural network trained to produce clipped signals. The use of the neural network allows for more intelligent clipping, allowing the clipping to be tailored to various scenarios.

The invention claimed is:

1. A method for receiving data at a receiving device, comprising:
  receiving, from a transmitting device, a clipped signal;
  recovering a signal from the clipped signal with a recovery module configured with at least one signaling context, the recovery module being configured on the receiving device and comprising a neural network trained for the at least one signaling context to recover signals from clipped signals, wherein the at least one signaling context comprises at least one of constellation size, channel conditions, or power level; and
  processing the signal to decode the data.

2. The method of claim 1, wherein the neural network is trained with at least one pair of training signals, each of the at least one pair of training signals comprising a training original signal and a training clipped signal.

3. The method of claim 2, wherein the neural network is trained to minimize a Mean-Square-Error (MSE) between a recovered signal, the recovered signal being computed in a forward pass of the neural network based on the training clipped signal of a pair of training signals from the at least one pair of training signals, and the training original signal of the pair of training signals.

4. The method of claim 1, further comprising:
  determining the at least one signaling context for the clipped signal; and
  configuring the recovery module with the signaling context.

5. The method of claim 4, wherein the neural network is trained based on a plurality of signaling contexts.

6. The method of claim 1, wherein the neural network is trained prior to installation on the receiving device.

7. The method of claim 1, further comprising transmitting the clipped signal and the signal to a server for training of a remote neural network.

8. The method of claim 1, further comprising:
  receiving, from a server, updates for the neural network; and
  applying, to the neural network, the updates.

9. The method of claim 1, wherein the clipped signal is generated by a clipping neural network corresponding to the neural network based on a dynamically varying threshold level.

10. A receiving device, comprising:
  a communications subsystem; and
  at least one processor;
  wherein the communications subsystem and the at least one processor cooperate to:
  receive, from a transmitting device, a clipped signal;
  recover a signal from the clipped signal with a recovery module configured with at least one signaling context, the recovery module being configured on the receiving device and comprising a neural network trained for the at least one signaling context to recover signals from clipped signals, wherein the at least one signaling context comprises at least one of constellation size, channel conditions, or power level; and
  process the signal to decode data.

11. The receiving device of claim 10, wherein the neural network is trained with at least one pair of training signals, each of the at least one pair of training signals comprising a training original signal and a training clipped signal.

12. The receiving device of claim 11, wherein the neural network is trained to minimize a Mean-Square-Error (MSE) between a recovered signal, the recovered signal being computed in a forward pass of the neural network based on the training clipped signal of a pair of training signals from the at least one pair of training signals, and the training original signal of the pair of training signals.

13. The receiving device of claim 10, wherein the communications subsystem and the at least one processor are further configured to:
  determine a signaling context of the at least one signaling context for the clipped signal; and
  configure the recovery module with the signaling context.

14. The receiving device of claim 13, wherein the neural network is trained based on a plurality of signaling contexts.

15. The receiving device of claim 10, wherein the neural network is trained prior to installation on the receiving device.

16. The receiving device of claim 10, wherein the communications subsystem and the at least one processor are further configured to transmit the clipped signal and the signal to a server for training of a remote neural network.

17. The receiving device of claim 10, wherein the communications subsystem and the at least one processor are further configured to:
  receive, from a server, updates for the neural network; and
  apply, to the neural network, the updates.

18. A non-transitory computer-readable medium having stored thereon executable code for execution by a processor of a receiving device, the executable code comprising instructions to cause the receiving device to perform operations including:
  receiving, from a transmitting device, a clipped signal;
  recovering a signal from the clipped signal with a recovery module configured with at least one signaling context, the recovery module being configured on the receiving device and comprising a neural network trained for the at least one signaling context to recover signals from clipped signals, wherein the at least one signaling context comprises at least one of constellation size, channel conditions, or power level; and
  processing the signal to decode data.

* * * * *